(12) United States Patent
Gallagher et al.

(10) Patent No.: US 11,468,654 B2
(45) Date of Patent: Oct. 11, 2022

(54) DETERMINING COMPASS ORIENTATION OF IMAGERY

(71) Applicant: Google LLC, Mountain View, CA (US)

(72) Inventors: Andrew Gallagher, Brooktondale, NY (US); Shuchang Zhou, Beijing (CN); Zhiheng Wang, Beijing (CN)

(73) Assignee: Google LLC, Mountain View, CA (US)

( * ) Notice: Subject to any disclaimer, the term of this patent is extended or adjusted under 35 U.S.C. 154(b) by 53 days.

(21) Appl. No.: 17/081,480

(22) Filed: Oct. 27, 2020

(65) Prior Publication Data

US 2021/0042552 A1 Feb. 11, 2021

Related U.S. Application Data

(62) Division of application No. 16/005,955, filed on Jun. 12, 2018, now Pat. No. 11,132,573, which is a division of application No. 14/761,200, filed as application No. PCT/CN2014/084674 on Aug. 18, 2014, now Pat. No. 10,032,087.

(51) Int. Cl.
*G06V 10/24* (2022.01)
*G06T 7/73* (2017.01)
*G01C 17/34* (2006.01)
*G06V 10/44* (2022.01)
*G06V 20/00* (2022.01)

(52) U.S. Cl.
CPC ........... *G06V 10/242* (2022.01); *G01C 17/34* (2013.01); *G06T 7/73* (2017.01); *G06V 10/243* (2022.01); *G06V 10/44* (2022.01); *G06V 20/38* (2022.01); *G06T 2207/10004* (2013.01); *G06T 2207/30244* (2013.01)

(58) Field of Classification Search
None
See application file for complete search history.

(56) References Cited

U.S. PATENT DOCUMENTS

| 7,809,191 | B2 * | 10/2010 | Furukado | G06T 7/73 |
| | | | | 382/282 |
| 8,355,868 | B2 | 1/2013 | Brace | |
| 8,620,582 | B2 | 12/2013 | Dods et al. | |
| 8,676,490 | B1 * | 3/2014 | Rosenwinkel | G01C 21/02 |
| | | | | 701/489 |
| 8,837,782 | B1 | 9/2014 | Rosenwinkel et al. | |
| 2007/0117078 | A1 | 5/2007 | Bruns et al. | |

(Continued)

FOREIGN PATENT DOCUMENTS

| CN | 101344391 A | 1/2009 |
| CN | 102067164 A | 5/2011 |

(Continued)

OTHER PUBLICATIONS

Yunpeng Li, Noah Snavely and Danifi P. Huttenlocher, "Location Recognition Using Prioritized Feature Matching", Sep. 2010, 14 pages.

(Continued)

*Primary Examiner* — Bernard Krasnic
(74) *Attorney, Agent, or Firm* — Lerner, David, Littenberg, Krumholz & Mentlik, LLP

(57) ABSTRACT

The orientation of imagery relative to a compass bearing may be determined based on the position of the sun or other information relating to celestial bodies captured in the image.

20 Claims, 10 Drawing Sheets

(56) References Cited

U.S. PATENT DOCUMENTS

| | | | |
|---|---|---|---|
| 2007/0150198 A1* | 6/2007 | MacDonald | G01W 1/12 |
| | | | 702/2 |
| 2007/0195089 A1* | 8/2007 | Furukado | G06T 7/73 |
| | | | 345/426 |
| 2011/0018990 A1 | 1/2011 | Komoto et al. | |
| 2011/0090244 A1 | 4/2011 | Pantfoerder | |
| 2011/0275408 A1 | 11/2011 | Kulik | |
| 2012/0227273 A1 | 9/2012 | Morcom | |
| 2013/0325316 A1 | 12/2013 | Vos et al. | |
| 2014/0105458 A1 | 4/2014 | Ponssard et al. | |

FOREIGN PATENT DOCUMENTS

| | | |
|---|---|---|
| CN | 102884398 A | 1/2013 |
| CN | 103416050 A | 11/2013 |
| WO | 2011140501 A1 | 11/2011 |

OTHER PUBLICATIONS

"Poor Man's Methods to Determine Azimuth" [online], <http://www.iol.ie/~geniet/eng/poormans.htm>, 6 pages, Jul. 29, 2014.

"Calculating an Angle From a Picture", <http://www.iol.ie/~geniet/eng/fotometry.htm>, 2 pages, Jul. 29, 2014.

"Analemma", [online], <http://en.wikipedia.org/wiki/analemma#Estimating_sunrise_and_sunset_data.2C_using_analemma>, 10 pages, Jul. 29, 2014.

"Sorting Holiday Photos Without a GPS: What Can We Expect From Contents-Based Geo-Spatial Image Tagging", [online], <http://link.springer.com/chapter/10.1007/978-3-642-10467-1_22>, 4 pages, Jul. 29, 2014.

"SunCalc", [online], <http://suncalc.net>, 1 page, Jul. 29, 2014.

"How to Find True North", [online] <http://adventure.howstuffworks.com/survival/.wilderness/true-north2.htm>, 4 pages, Jul. 29, 2014.

Minwoo Park, Jiebo Luo, Robert T. Collins, and Yanxi Liu, Beyond GPS: Determining the Camera Viewing Direction of a Geotagged Image, Oct. 25-29, 2010, 4 pages.

Martin Szummer and Rosalind W. Picard, Indoor-Outdoor Image Classification, IEEE Intl Workshop on Content-based Acces of Image and Video Databases, Jan. 1998, 10 pages.

International Search Report and Written Opinion for Application No. PCT/CN2014/084674 dated May 20, 2015.

Supplementary Partial European Search Report dated Mar. 20, 2018, for European Patent Application No. 14900222.2. 18 pages.

Extended European Search Report for European Patent Application No. 14900222.2, dated Jun. 26, 2018. 14 pages.

Zheng Shuo et al. "Design of cam mechanism of solar tracking based on COSMOSMotion." Dec. 31, 2011. Transactions of the CSAE. vol. 27, No. 12, pp. 43-46.

Office Action for Chinese Patent Application No. 201480079425.4, dated Dec. 17, 2018.

* cited by examiner

DETERMINING COMPASS ORIENTATION OF IMAGERY

CROSS REFERENCE TO RELATED APPLICATIONS

The present application is a divisional of U.S. patent application Ser. No. 16/005,955, filed on Jun. 12, 2018, which is a divisional of U.S. patent application Ser. No. 14/761,200, filed on Jul. 15, 2015, now U.S. Pat. No. 10,032,087 issued on Jul. 24, 2018, which application is a national phase entry under 35 U.S.C. § 371 of International Application No. PCT/CN2014/084674 filed Aug. 18, 2014, all of which are incorporated herein by reference.

BACKGROUND

Photo spheres include imagery that covers the whole or portion of a sphere of view captured by a camera. For instance, a photo sphere may have a field of view that captures 360° of the features visible to the camera in both the horizontal and vertical directions. Each portion of the imagery may be associated with a relative angle value. By way of example, vertical directions may be referenced relative to a gravity vector, where 0° in the vertical direction may correspond with the horizon, -90° in the vertical direction may represent the view looking straight down and 90° in the vertical direction may represent the view looking straight up. Horizontal directions may correspond with compass bearings. For instance, 0° in the horizontal direction may correspond with due north, and 90°, 180° and 270° in the horizontal direction may correspond with due east, south and west, respectively. The horizontal coordinate of the photo sphere corresponds with an azimuth angle, and the vertical coordinate corresponds with an elevation angle.

The orientation of the sphere relative to compass bearings may be measured and stored based upon readings from a magnetic compass. For example, at the time the user of a mobile device (such as a phone) begins capturing a scene with the device's camera for the purpose of creating a photo sphere, the device may identify the orientation based on the device's internal compass and the gravity vector based on the device's internal accelerometer. The orientation may be defined with respect to a vector that is orthogonal to the gravity vector and points north. The orientation may also be identified by using a device's gyroscope to measure changes in the device's yaw relative to an initial compass bearing. The device may also store the date, time and geographic location at the time of capture as well.

In certain circumstances, the compass direction in which a photo was taken may be determined by matching the content of photo to an existing database of geographic features with known geographic locations. For example, patches or interest points in a first image might be used to query a database of patches or interest points having known geographic locations, such as by using structure-from-motion (SfM) techniques.

The orientation of the photo sphere may be used when displaying the photo sphere to users. For example, a viewer may request to view a specific direction of a photo sphere (e.g., either by interacting with the photo sphere itself, through a map-based control, programmatically, etc.).

BRIEF SUMMARY

Aspects of the disclosure provide a method. The method includes identifying, by one or more computing devices, a position of a feature in imagery based on the visual similarity of the feature to a celestial object. An elevation value may be associated with the elevation angle of the celestial object and determined, by the one or more computing devices, based on the position of the feature within the imagery. An azimuth value associated with the azimuth of the celestial object may be determined, by the one or more computing devices, based on the likelihood of the celestial object being at a particular azimuth at the elevation angle over a plurality of days. A compass orientation of the imagery may be determined, by the one or more computing devices, on the azimuth value.

Another aspect of the disclosure provides a system that includes one or more processors and a memory storing instructions. The instructions are executable by the processor and include: identifying a position of a feature in imagery based on the visual similarity of the feature to a shadow; determining a compass bearing based on the position of the feature in the imagery; and associating a portion of the imagery with the determined compass bearing.

Still another aspect of the disclosure provides a system that includes one or more processors and a memory storing instructions that are executable by the processor. The instructions include: identifying a first position of a first feature in imagery based on the visual similarity of the first feature to a celestial object; identifying a second position of a second feature in the imagery based on the visual similarity of the feature to an object associated with a geographic location; determining, based on the position of first position relative to the second position, an azimuth angle; and associating a portion of the imagery with the determined azimuth angle.

DETAILED DESCRIPTION

Overview

The technology relates to determining the compass orientation of imagery. For instance, a user may use one or more computing devices to capture and upload a photo sphere, and one or more computing devices may determine the portion of the photo sphere that faces north by detecting the position of a celestial object within the imagery.

Figure 2:
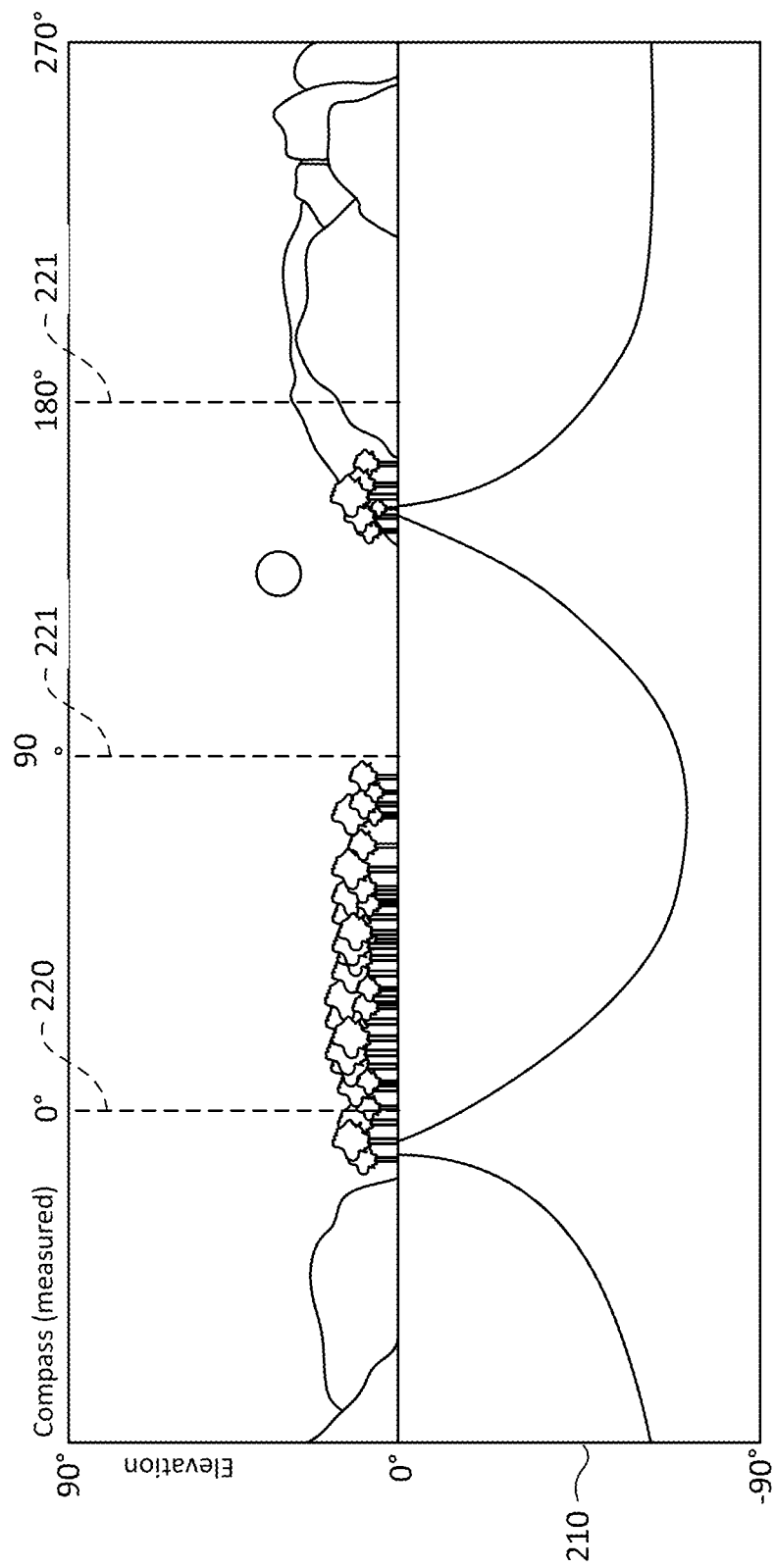
FIG. 2 is an example of the orientation of example imagery.

By way of example, FIG. 2 is an example of a photo sphere that has been flattened by projecting the sphere onto a flat surface for the purposes of illustration. The photo sphere may be associated with a compass bearing. For example, at the time a device was used to capture the imagery, the device's magnetic compass may have been used to identify the portion of the photo that is facing north. The device may have further captured the date, time and geographic location at which the imagery was captured.

Figure 3:
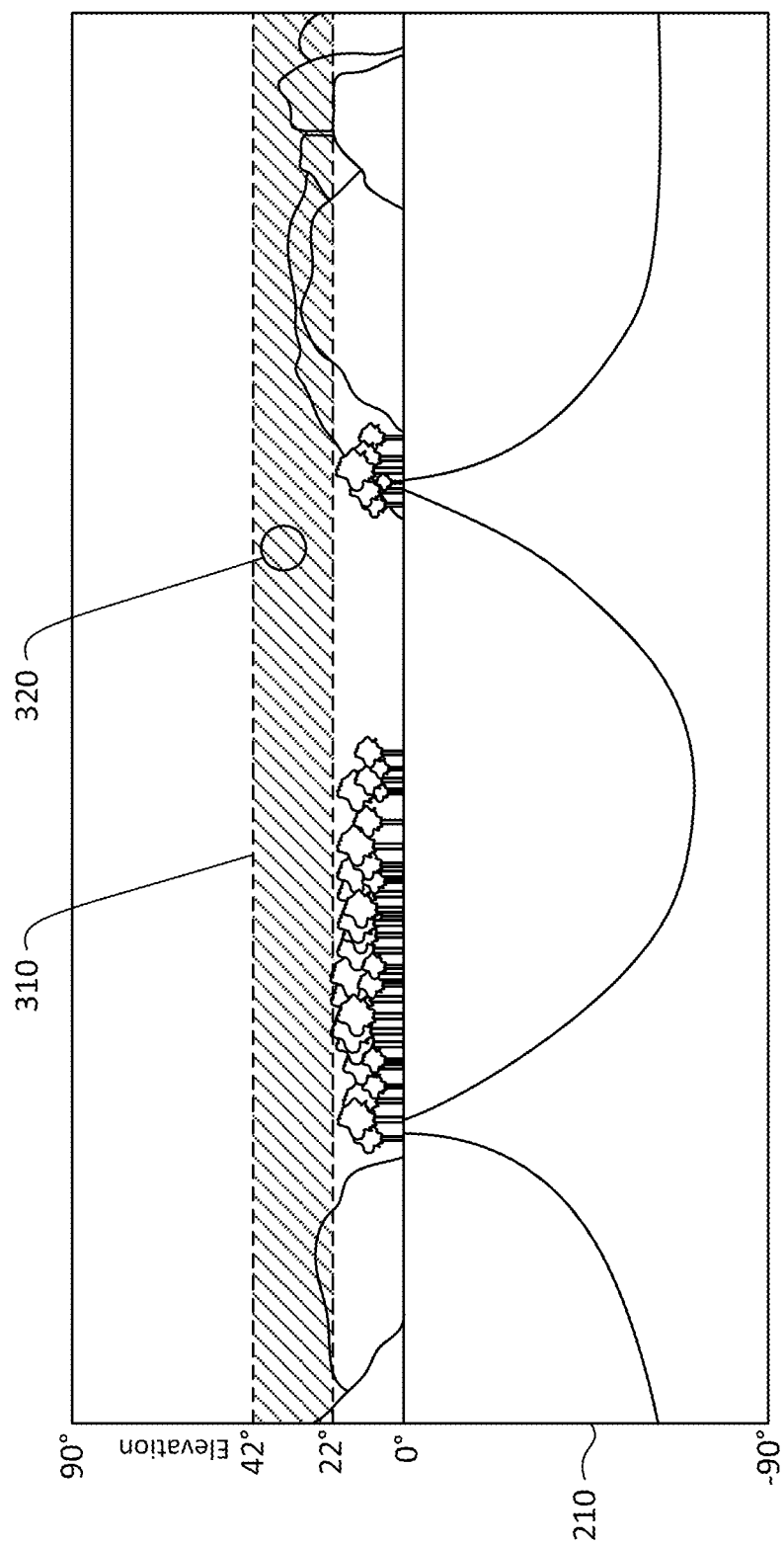
FIG. 3 is an example of locating visual features in example imagery.
Figure 5:
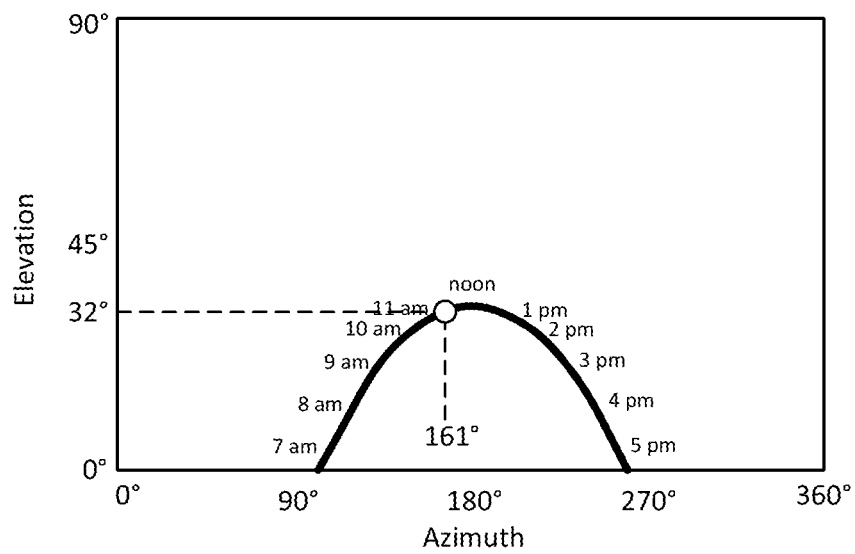
FIG. 5 is a graph of the azimuth of the sun relative to elevation over the course of a day at an example geographic location.

The information captured by the device and associated with the photo sphere may be used to determine the expected location of the sun within the photo sphere. For instance and as shown in FIG. 5, the elevation and azimuth of the sun when the photo sphere was captured may be calculated based on the geographic location, date and time associated with the photo sphere. As shown in FIG. 3, the calculated elevation (y-coordinate) may be used to identify a range of elevations within which to perform a search for a feature within the photo sphere having the visual characteristics of the sun.

Figure 4:
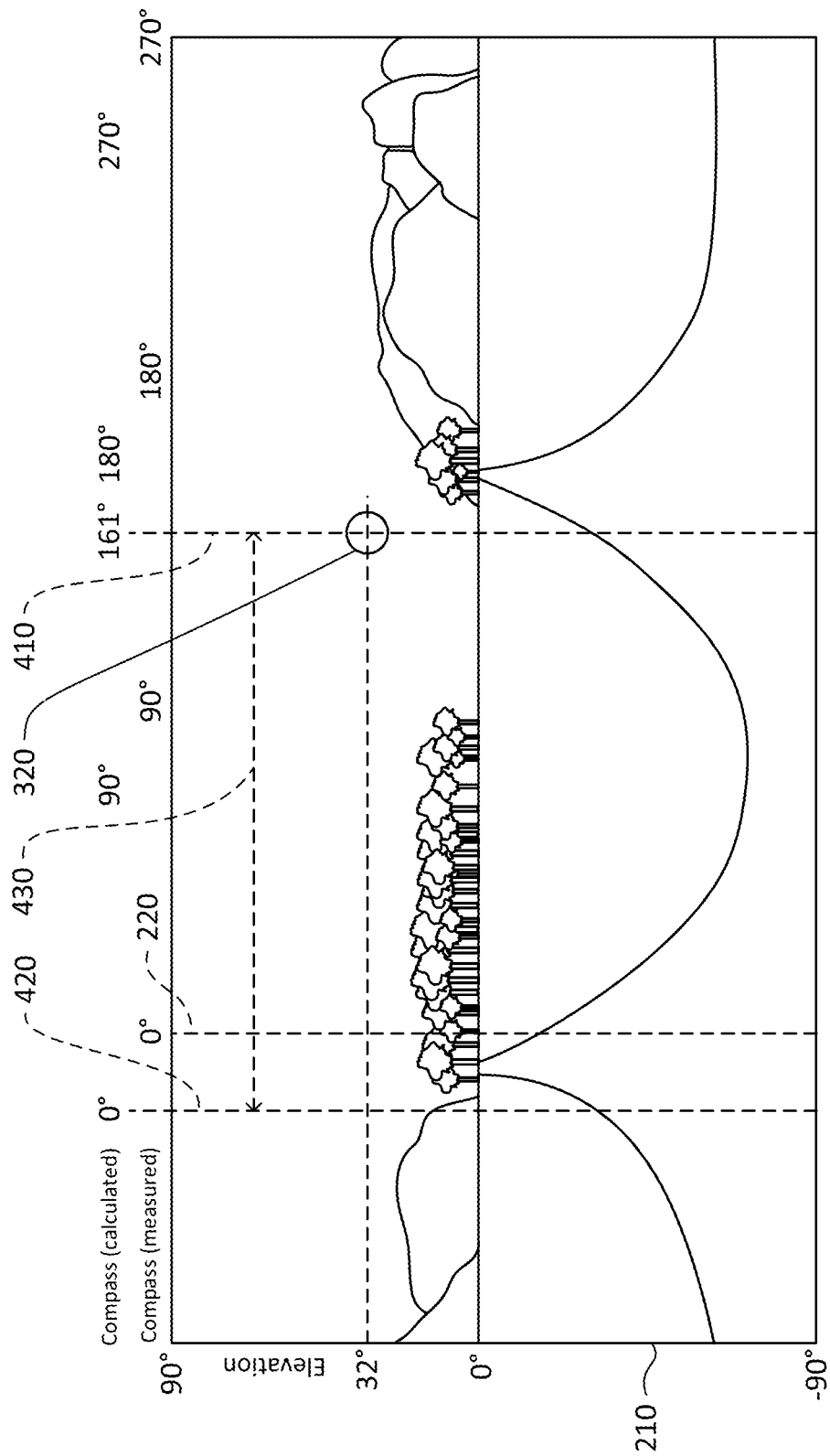
FIG. 4 is an example of determining the orientation of example imagery.

Once the sun has been located, its position within the photo sphere may be used to adjust the orientation associated with the photo sphere. For instance and as shown in FIG. 4, the horizontal position (x-coordinate) of the sun within the photo sphere may be associated with a compass bearing that is equal to the calculated azimuth of the sun. The horizontal position of due north of the photo sphere may then be determined based on the horizontal position of the sun and the calculated azimuth of the sun. To the extent there is a difference between the previously-stored relative orientation of due north and the calculated relative orientation of due north, the orientation of due north associated with the photo sphere may be modified based on the difference.

Figure 6:
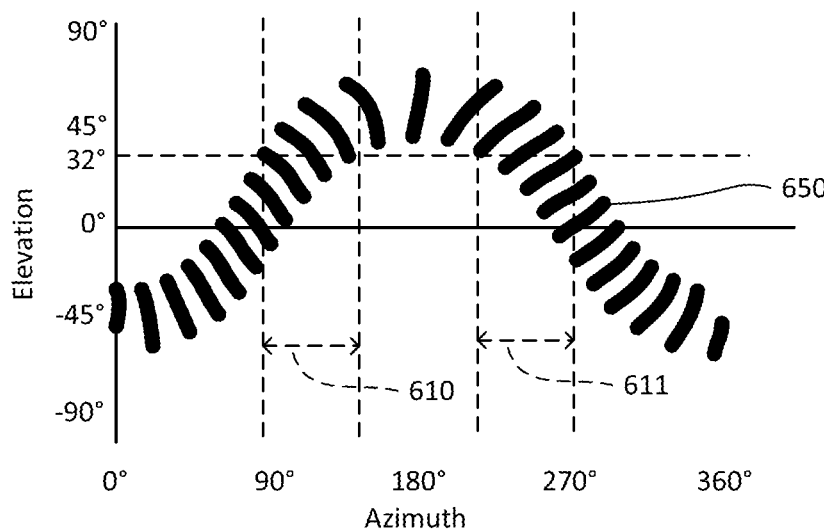
FIG. 6 is a graph of the azimuth of the sun relative to elevation over the course of a year at an example geographic location.
Figure 7:
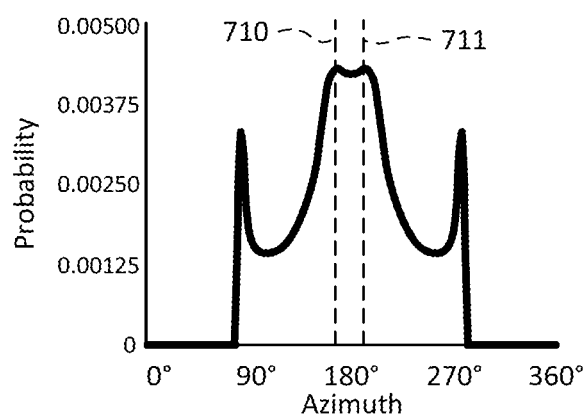
FIG. 7 is a graph of the probability of the sun being at a particular azimuth at an example geographic location.

The orientation of the photo sphere may also be estimated from the position of the sun when the date and time of capture of the photo sphere are unknown. FIG. 6 graphs the position of the sun every hour over every day of an entire year at a particular geographic location. There are 24 marks, one for each hour of the day, and each mark is a collection of 365 points showing where the sun is at that hour over the course of the year. As illustrated by the graph, there is a limited range of possible azimuths when the sun is at a given elevation. For instance, if the sun is at the horizon (elevation 0°), the sun is either rising in the east (e.g., at or near 90°) or setting in the west (e.g., at or near 270°); the azimuth of the sun will not be due south (azimuth 180°). However, if the sun is at its highest point in the sky, then in the northern hemisphere, the sun is directly overhead or due south of directly overhead. FIG. 7 is an example of the probability of the sun being at different azimuths when the sun is at a particular elevation at a particular geographic location.

Figure 8:
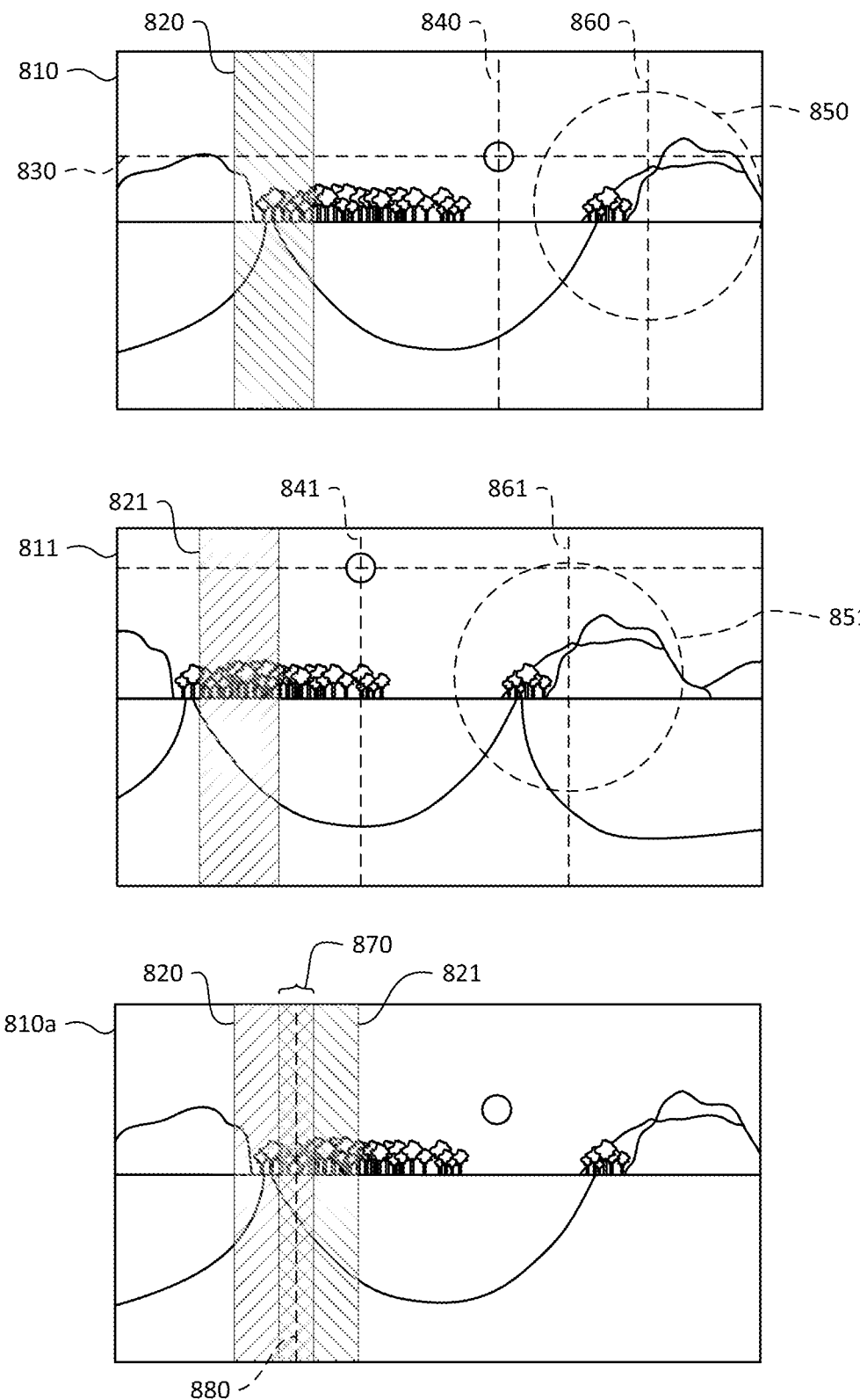
FIG. 8 is an example of determining the orientation of example imagery.

The calculated orientation of one photo sphere may be based on the calculated orientation of another photo sphere including, by way of example, when multiple photo spheres were captured in proximity to each other. For instance and as shown in FIG. 8, the calculated orientation of each photo sphere may be based on visual feature matching and orientations calculated for the other photo spheres.

Figure 9:
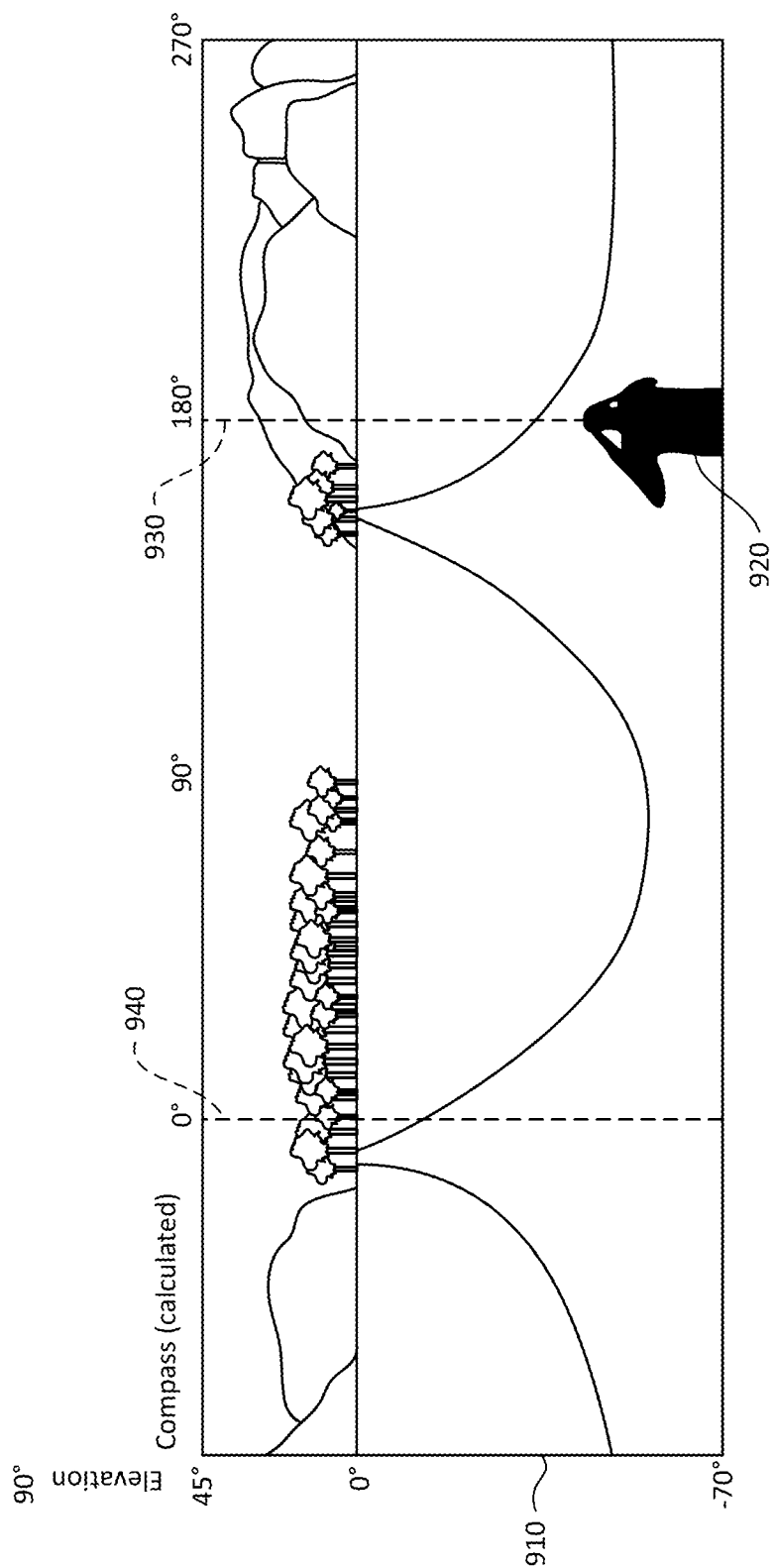
FIG. 9 is an example of determining the orientation of example imagery.

The orientation of a photo sphere may also be estimated based on shadows. By way of example and as shown in FIG. 9, the position of the sun may be hard to determine if imagery of the photo sphere does not extend high enough to capture the sun, or if the sun itself is occluded from view of the image capture device. In the event the device has difficulty locating the sun within the image, the device may determine whether there are visual features within the image that are visually similar to the shadow of a photographer taking a picture. If so, the device may determine that the azimuth coordinate of the sun is 180° offset from the azimuth of the vector directed from the nadir of the photo sphere (the point at −90 degrees in elevation) through the center of the shadow of the photographer.

Figure 10:
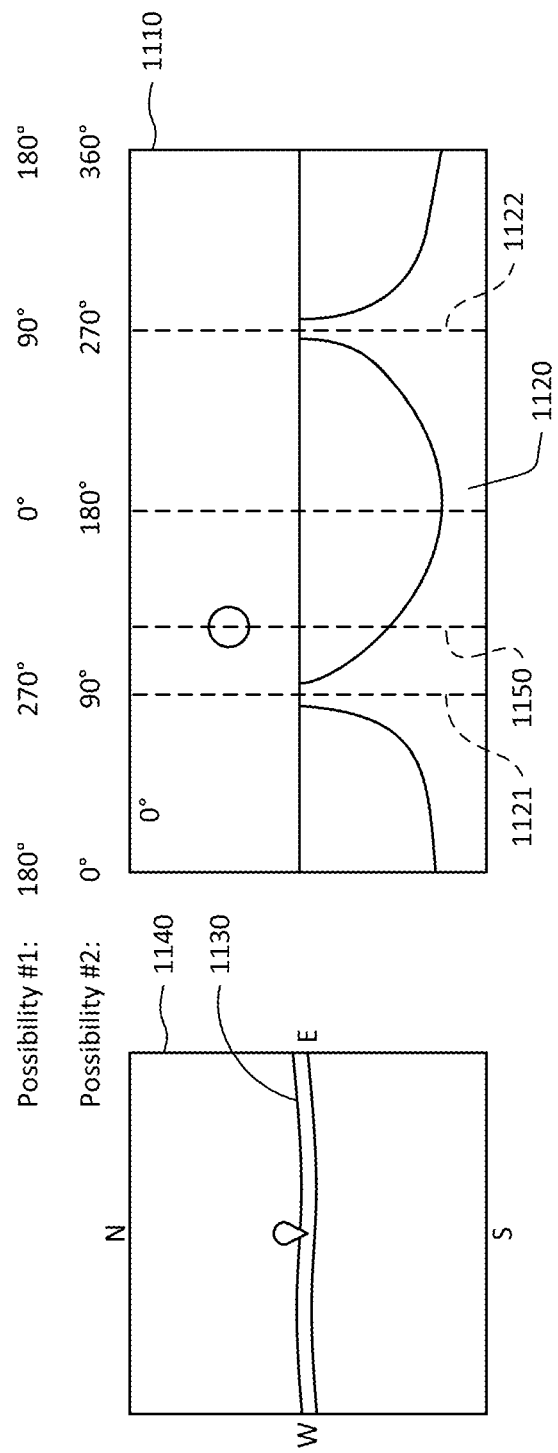
FIG. 10 is an example of determining the orientation of example imagery.

The position of the sun may also be used to resolve orientation ambiguities relating to features with known geographic locations. As shown in FIG. 10, an image may have been captured at a geographic location without orientation information. The computing device may determine whether the location of the image is proximate to a feature with a known geographic location, such as a road. If so, the computing device may determine the position of the sun relative to the feature, such as determining whether a particular portion of a road is going to the east or the west.

Example Systems

Figure 1:
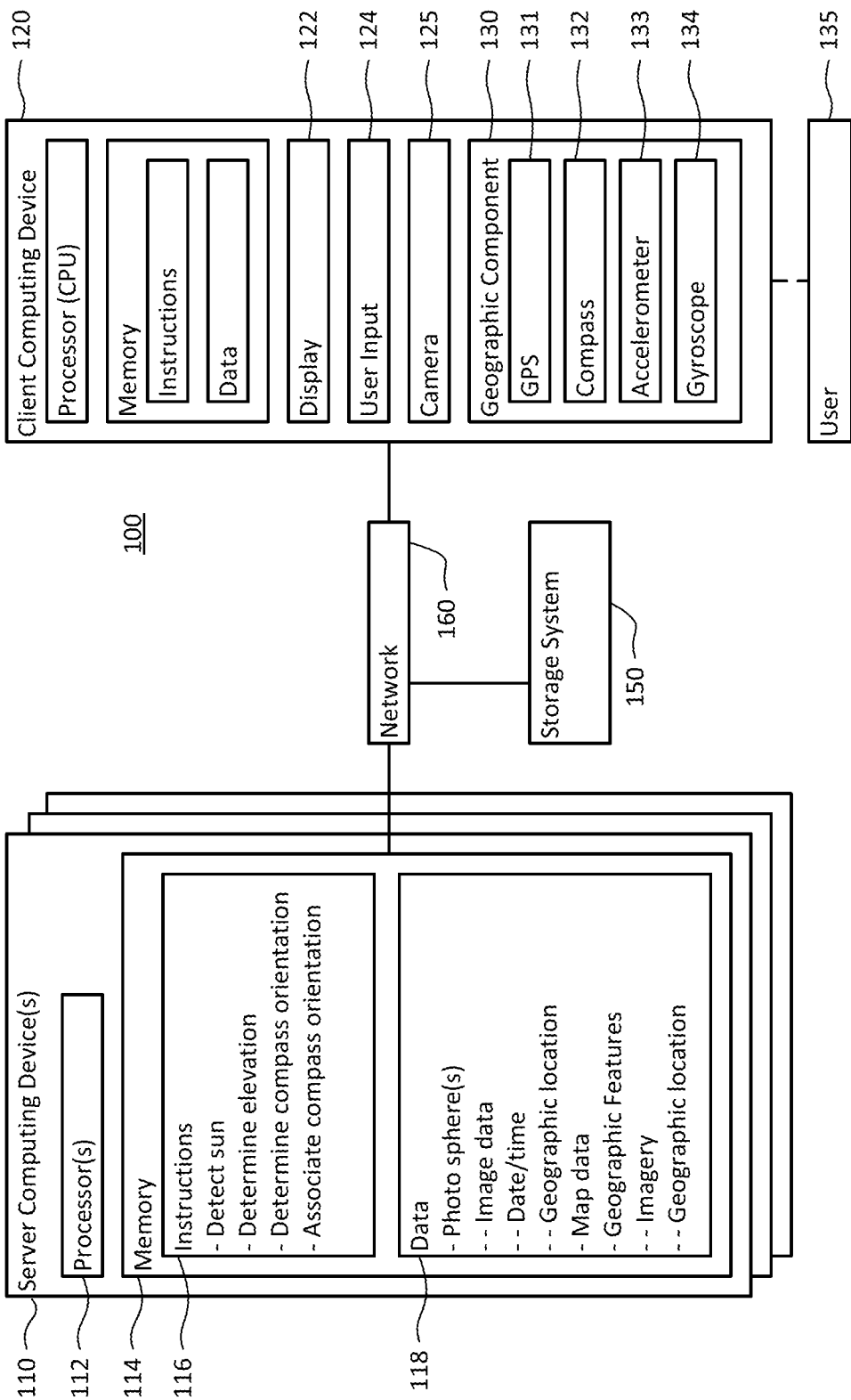
FIG. 1 is a functional diagram of a system in accordance with an aspect of the system and method.

FIG. 1 illustrates one possible system 100 in which the aspects disclosed herein may be implemented. In this example, system 100 may include computing devices 110 and 120. Computing devices 110 may contain one or more processors 112, memory 114 and other components typically present in general purpose computing devices. Although FIG. 1 functionally represents each of the processor 112 and memory 114 as a single block within device 110, which is also represented as a single block, the system may include and the methods described herein may involve multiple processors, memories and devices that may or may not be stored within the same physical housing. For instance, various methods described below as involving a single component (e.g., processor 112) may involve a plurality of components (e.g., multiple processors in a load-balanced server farm). Similarly, various methods described below as involving different components (e.g., device 110 and device 120) may involve a single component (e.g., rather than device 120 performing a determination described below, device 120 may send the relevant data to device 110 for processing and receive the results of the determination for further processing or display).

Memory 114 of computing device 110 may store information accessible by processor 112, including instructions 116 that may be executed by the processor 112. Memory 114 may also include data 118 that may be retrieved, manipulated or stored by processor 112. Memory 114 and the other memories described herein may be any type of storage capable of storing information accessible by the relevant processor, such as a hard-disk drive, a solid state drive, a memory card, RAM, DVD, write-capable memory or read-only memory. In addition, the memory may include a distributed storage system where data, such as data 150, is stored on a plurality of different storage devices which may be physically located at the same or different geographic locations.

The instructions 116 may be any set of instructions to be executed by processor 112 or other computing device. In that regard, the terms "instructions," "application," "steps" and "programs" may be used interchangeably herein. The instructions may be stored in object code format for immediate processing by a processor, or in another computing device language including scripts or collections of independent source code modules, that are interpreted on demand or compiled in advance. Functions, methods and routines of the instructions are explained in more detail below. Processor 112 may be any conventional processor, such as a commercially available CPU. Alternatively, the processor may be a dedicated component such as an ASIC or other hardware-based processor.

Data 118 may be retrieved, stored or modified by computing device 110 in accordance with the instructions 116. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The computing device 110 may be at one node of a network 160 and capable of directly and indirectly communicating with other nodes of network 160. Although only a few computing devices are depicted in FIG. 1, a typical system may include a large number of connected computing devices, with each different computing device being at a different node of the network 160. The network 160 and intervening nodes described herein may be interconnected using various protocols and systems, such that the network may be part of the Internet, World Wide Web, specific intranets, wide area networks, or local networks. The network may utilize standard communications protocols, such as Ethernet, Wi-Fi and HTTP, protocols that are proprietary to one or more companies, and various combinations of the foregoing. As an example, computing device 110 may be a web server that is capable of communicating with computing device 120 via the network 160. Computing device 120 may be a client computing device, and server 110 may display information by using network 160 to transmit and present information to a user 125 of device 120 via display 122. Although certain advantages are obtained when information is transmitted or received as noted above, other aspects of the subject matter described herein are not limited to any particular manner of transmission of information.

Computing device 120 may be configured similarly to the server 110, with a processor, memory and instructions as described above. Computing device 120 may be a personal computing device intended for use by a user and have all of the components normally used in connection with a personal computing device such as a central processing unit (CPU), memory storing data and instructions, a display such as display 122 (e.g., a monitor having a screen, a touch-screen, a projector, a television, or other device that is operable to display information), user input device 124 (e.g., a mouse, keyboard, touchscreen, microphone, etc.), and camera 125.

Computing device 120 may also be a mobile computing device capable of wirelessly exchanging data with a server over a network such as the Internet. By way of example only, device 120 may be a mobile phone or a device such as a wireless-enabled PDA, a tablet PC, a wearable computing device or a netbook that is capable of obtaining information via the Internet. The device may be configured to operate with an operating system such as Google's Android operating system, Microsoft Windows or Apple iOS. In that regard, some of the instructions executed during the operations described herein may be provided by the operating system whereas other instructions may be provided by an application installed on the device. Computing devices in accordance with the systems and methods described herein may include other devices capable of processing instructions and transmitting data to and from humans and/or other computers including network computers lacking local storage capability and set top boxes for televisions.

Computing device 120 may include a component 130, such as circuits, to determine the geographic location and orientation of the device. For example, client device 120 may include a GPS receiver 131 to determine the device's latitude, longitude and altitude position. The component may also comprise software for determining the position of the device based on other signals received at the client device 120, such as signals received at a cell phone's antenna from one or more cell phone towers if the client device is a cell phone. It may also include a magnetic compass 132, accelerometer 133 and gyroscope 134 to determine the direction in which the device is oriented. By way of example only, the device may determine its pitch, yaw or roll (or changes thereto) relative to the direction of gravity or a plane perpendicular thereto.

Server 110 may store map-related information, at least a portion of which may be transmitted to a client device. The map information is not limited to any particular format. For instance, the map data may include bitmap images of geographic locations such as photographs captured by a satellite or aerial vehicles. The map data may also include information that may be rendered as images in advance or on demand, such as storing street locations and pedestrian trails as latitude/longitude/altitude-based vectors, and street and trail names as text.

Server 110 may also store imagery such as, by way of example only, a flat photograph, a photo sphere, or a video of scenery. The imagery may be captured and uploaded by end users for the purpose of making the photo accessible for later access or to anyone searching for information related to the feature. In addition to the image data captured by a camera, individual items of imagery may be associated with additional data, such as date of capture, time of day of capture, and the geographic location of capture (e.g., latitude, longitude and altitude) or the geographic locations of features captured in the imagery. Portions of the imagery may be associated with additional information including depth information (e.g., the distance between a portion of the imagery capturing a feature and the camera) and, as described above, relative orientation angles.

Server 110 may also store features associated with geographic locations. For example, features may include a landmark, a store, a lake, a point of interest, or any other visual object or collection of objects at a given location.

Locations may be expressed in various ways including, by way of example only, latitude/longitude/altitude, a street address, x-y coordinates relative to edges of a map (such as a pixel position relative to the edge of a street map), and other reference systems capable of identifying geographic locations (e.g., lot and block numbers on survey maps). Moreover, a location may define a range of the foregoing. For example, a satellite image may be associated with a set of vertices defining the boundaries of an area, such as storing the latitude/longitude of each location captured at the corner of the image. The system and method may further translate locations from one reference system to another. For example, the server 110 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939°)). In that regard, locations received or processed in one reference system may also be received or processed in other references systems.

Example Methods

Operations in accordance with a variety of aspects of the invention will now be described. It should be understood that the following operations do not have to be performed in the precise order described below. Rather, various steps can be handled in different order or simultaneously.

A user 135 of a mobile device 120 may use camera 125 to capture a photo sphere of scenery. By way of example, as the user changes the pitch, yaw or roll of camera, the device may store the images captured by the camera. As the image is being captured, the device may associate the output of accelerometer 133 and gyroscope 134 with the relevant portions of the imagery. For instance, the device may use the accelerometer 133 to map portions of the imagery relative to vector that corresponds with gravity (e.g., straight down). The device may also use the gyroscope 134 to map portions of the imagery relative to an initial yaw value. Yet further, the device may associate yaw values with the then-current compass bearing based on the output of compass 132. Based on the yaw values and the direction of north as indicated by the compass 132, the device may further map portions of the imagery relative to a vector that corresponds with due north.

FIG. 2 is an example of a photo sphere that has been flattened for the purposes of illustration. The bottom of imagery 210 corresponds with an elevation of −90° (e.g., straight down), the top of imagery 210 corresponds with an elevation of 90° (e.g., straight up), and the vertical middle of imagery 210 corresponds with an elevation of 0° (e.g., the horizon). The horizontal length of imagery 210 spans 360° of yaw and corresponds with an azimuth direction. A particular portion of the imagery may be associated with the due north based on the output of compass 132. For instance, reference line 220 identifies the horizontal position of due north relative to the imagery 210. Reference lines 221 correspond with due east and due south, respectively. The left and right edges of the imagery 210 correspond with due west.

Various factors may interfere with the accuracy of the information received from the compass. For instance, many magnetic compasses require periodic calibration to maintain accuracy and reduce accumulated magnetic effect. Moreover, neighboring concrete-steel structures or mineral deposits may distort the magnetic field at the capture location.

The device may also associate the date and time that the imagery was captured with the imagery. The device may further associate a geographic location proximate to the camera with the imagery, e.g., the latitude, longitude and altitude output by GPS component 131. For instance, the image data, date, time, location and compass direction may be stored in a file and uploaded by the user to server 110.

The information captured by the device and associated with the imagery may be used to determine the expected location of the sun within the imagery. For instance, processor 112 of server 110 may execute various algorithms to calculate the elevation of the sun on a particular date at a particular time and at a particular geographic location (e.g., http://aa.usno.navy.mil/data/docs/AltAz.php).

FIG. 5 is a sample graph of the position of the sun over the course of the day on which the imagery 210 was captured. At sunrise, the elevation of the sun is 0° (e.g., the horizon) and the azimuth is 95° (e.g., a few degrees south of due east). As the day progresses, both the elevation and azimuth increase until solar noon, at which point the sun is at its highest position and, in the northern hemisphere, is south of the geographic location. As the day progresses after solar noon, the azimuth continues to increase as the sun progresses to the west but the elevation decreases as the sun begins to go down. Finally, at sunset, the elevation of the sun is again at 0° (e.g., the horizon) and the azimuth is 265° (e.g., a few degrees south of due west). For the purposes of illustration, it will be assumed that imagery 210 was captured shortly before noon, in which case server 100 may calculate that the sun's elevation is 32° and its azimuth is 161°.

The calculated elevation may be used to identify a range of elevations within which to search the imagery for a feature having the visual characteristics of the sun. For instance and as shown in FIG. 3, the processor may use computer vision techniques to search the portion 310 of imagery 210 that corresponds with an elevation of 32°+/− 10°. The processor may search portion 310 for visual characteristics such as brightness intensity, brightness intensity compared with the surrounding area, portion of the image with a color similar to blue sky, roundness of the region with intensity greater than a threshold, and compactness of a region with intensity greater than a threshold. In that regard, the processor may identify visual feature 320 of imagery 210 as the sun.

In some aspects, a user may be prompted to view the imagery and identify the position of sun within the imagery, such as by clicking on it.

Once the sun has been located, its position within the photo sphere may be used to calculate an orientation associated with the imagery. For instance and as shown in FIG. 4, the server may identify the horizontal center 410 of the sun 320. Based on the prior calculation, the processor then determines that horizontal coordinate 410 corresponds with an azimuth of 161°. Therefore, the difference 430 between the sun and due north is 161°, e.g., the portion of the imagery at reference line 420 is associated with due north. The azimuth associated with other portions of the imagery may be similarly calculated, as shown by the degree values on the line entitled "Compass (calculated)".

To the extent there is a difference between the previously-stored orientation and the calculated orientation, the orientation may be modified based on the difference. For instance, the system may associate the imagery with a due north position that is the average of the position determined from the device's magnetic compass and the position determined based on the sun's position.

The position may also be determined based on a confidence value that is indicative of the expected accuracy of the measured orientation and calculated orientation. By way of example, the metadata associated with the imagery may indicate that the magnetic compass was in need of calibration at the time the image was captured, in which case confidence in the accuracy of the measured orientation may be low. Similarly, the metadata associated with the imagery may indicate a model number of the device, and the server may have historical information relating to the quality of the compass in that model.

If the visual characteristics of features in the imagery make it difficult to determine the precise center of the sun, confidence in the accuracy of the calculated orientation may also be relatively low. For example, a confidence value associated with the calculated orientation may be determined based on brightness intensity, brightness intensity compared with the surrounding area, portion of the image with a color similar to blue sky, roundness of the region with intensity greater than a threshold, compactness of a region with intensity greater than a threshold. In addition, additional features may be used, such as a score from an indoor/outdoor detector that analyzes the pixels of an image and produces a confidence score that the image is an outdoor image (e.g., an indoor/outdoor detector as described in M. Szummer and R. W. Picard, "Indoor-Outdoor Image Classification", in Proc. IEEE International Workshop on Content-based Access of Image and Video Databases, 1998. pp. 42-51, the disclosure of which is incorporated herein by reference). These features may be used as input to a machine learning system such as a Support Vector Machine (SVM) to produce a confidence score that a putative detected sun in an image actually corresponds to the sun. For example, the SVM may produce a confidence score of 0.98 for the visual feature 320 of the image in FIG. 4, indicating that, based on the algorithm, it is 98% likely that the visual feature 320 is actually the sun.

The orientation associated with the imagery may be determined based on the confidence values of the measured and calculated orientation. By way of example, if the confidence value of the calculated orientation is greater than the confidence value of the measured orientation, or greater than a threshold, then the system may disregard the measured orientation. The orientation associated with the imagery may also be determined based on the relative value of the confidence values, e.g., set in between the measured and calculated orientations at a distance from each that is inversely proportional to the confidence values of the two orientations. In yet another example, the calculated orientation may be disregarded completely if its confidence value fails to exceed a threshold, e.g. 0.9, without regard to the measured orientation (if any).

The orientation of the photo sphere may also be estimated from the position of the sun when the date and time of the photo sphere are unknown. FIG. 6 graphs the position of the sun at a particular latitude every hour over every day of an entire year. There are 24 marks such as mark 650, where each mark is a collection of 365 points showing where the sun is at that hour over the course of the year. As illustrated by the graph, there is a limited range of possible azimuths when the sun is at a given elevation. For instance, for a photo sphere captured in Yosemite National Park, Calif., if the sun is at the horizon (elevation 0°), the sun is either rising in the east (e.g., at or near an azimuth of 90°) or setting in the west (e.g., at or near an azimuth of 270°); the azimuth of the sun will not be due south (azimuth 180°). However, if the sun is at its highest point in the sky then, at Yosemite National Park, Calif., the sun will be either directly overhead or due south of directly overhead. Thus, each elevation is associated with a range of possible azimuths for a given geographic location. For instance and as shown in FIG. 6, when the sun is at an elevation of 32°, the only possible ranges of azimuths are ranges 610 and 611. If the date of capture is unknown, the system may estimate the azimuth based on the possible azimuth ranges at the determined elevation, such as selecting a value within the ranges.

The azimuth may also be estimated based on the probability of the sun being at a particular elevation. For example, not all of the possible azimuths for a given elevation may be equally likely. FIG. 7 is an example of the probability of the sun being at different azimuths when the sun is at a particular elevation at a particular latitude and longitude over the course of a year. The probability of a particular azimuth value based on a particular elevation of the sun and latitude and longitude may be determined by estimating the amount of time that the sun is positioned near the particular elevation throughout the course of the year, and normalizing the estimate by the length of a year so that the sum of probabilities assigned to all possible azimuth values sums to 1.0. Based on the graph, the azimuth is most likely to be approximately 175° or 185° as indicated by reference lines 710 and 711. In that regard, when the system determines the elevation of the sun and the latitude, the system may select either the most probable azimuth or one of the most probable azimuths, or an azimuth value that minimizes a maximum possible error.

Various combinations of date and time information may be used to increase the accurate of the estimate. By way of example, if the date is not known but the time or a range of times are known, the number of possible azimuths can be narrowed by eliminating azimuths that are not possible for that location at that time or range of times. Similarly, if the date or a range of dates is known but the time is not known, the number of possible azimuths can be narrowed by eliminating azimuths that are not possible for that location on that date or during the range of dates. In either case, the probability of the remaining, possible azimuths may be increased, thus increasing the likelihood of selecting an azimuth near to the correct azimuth.

The system may use additional information in the image data to increase the accuracy of the estimate. For instance, the processor may analyze the image data for information indicative of the time of year, such as snow or bare trees indicating autumn, multi-colored leaves indicating fall, or green leaves indicating spring or summer. A range of dates can then be selected based on the season, thus increasing the accuracy of a probability function such as that that shown in FIG. 7.

The accuracy of the azimuth estimate in one photo sphere may be increased based on information obtained from other photo spheres. FIG. 8 illustrates two different example photo spheres 810 and 811 where the date of capture is unknown, but the locations are known and proximate to each other. As described above, the system may determine a range of probable azimuths 820, 821 based on the detected sun elevation 830, 831 and horizontal position 840, 841 in each image 810, 811 (respectively). The system may also determine that the same geographic feature 850 appears in both images using common computer-vision feature matching techniques, but at different horizontal positions 860, 861. The system may use the feature's different positions in each image as a common reference point, e.g., to determine the horizontal position of the range of probabilities relative to the feature. In that regard and as shown in image 810*a*, the system may apply the range of probabilities 821 in image 811 to narrow the range of probabilities 820 in image 810. For instance, a new range of probabilities 870 may be determined based on the intersection of ranges 820 and 821, and due north may be calculated as being positioned within the narrowed range of possibilities.

In other aspects, the system may determine the probability function (such as those shown in FIG. 7) for each image 810 and 820, and determine a new probability function for each image based on the product of the two functions.

The orientation of a photo sphere may also be estimated based on shadows. By way of example and as shown in FIG. 9, the position of the sun may be hard to determine if imagery of the photo sphere does not extend high enough to capture the sun, or if the sun itself is occluded from view of the image capture device. In the event the device has difficulty locating the sun within the image, the device may determine whether there are visual features within the image that match shadows that may be useful in determining the position of the sun. For instance, the system may search imagery 910 for a shadow 920 extending vertically up from the bottom of the photo sphere and having roughly the expected shape or dimensions of a person taking a photograph. If such a visual feature is found, the device may use the position of shadow 920 to estimate that the horizontal position 940 corresponding to the sun's azimuth, is 180° offset from the center of the shadow 920. Consequently, the horizontal coordinate corresponding to due north is determined by computing the position of the sun corresponding to the image capture time, latitude and longitude.

The system may further estimate the time of day based on the length of shadows. For instance, the system may estimate the length of a person's shadow on the ground based on the angle of elevation at the top of the shadow. The system may then determine the ratio of the shadow's ground length to an assumed average person's height, e.g., 1.75 m person. If the shadow is greatly shorter than the average height, then the time may be estimated as close to noon. If the shadow is greatly longer than the average height, then the time may be estimated to be close to sunrise or sunset. Using this estimated time, the system can produce an improved estimate of the azimuth corresponding to due north even when the image capture time was not known a priori.

The position of the sun may also be used to resolve orientation ambiguities relating to features with known geographic locations. FIG. 10 illustrates a photo sphere 1110. The system may analyze the imagery for features that may have known geographic locations. For instance, the system may determine that the image has captured a road 1120 stretching in two directions 1121 and 1122. The system may access its map data to determine if there are roads known to be proximate to the location at which the imagery was captured, and identify a road 1130 on map 1140 that extends from west to east. The system may thus determine that directions 1121 and 1122 correspond with east or west, but as shown as "Possibility #1" and "Possibility #2" in imagery 1110, there may be insufficient information to determine whether directions 1121 and 1222 correspond with east or west, respectively, or vice versa. As described above, the system may search imagery 1110 for, and identify the position 1150 of, the sun in the imagery. Once detected, the system may determine a range or set of ranges of azimuth locations corresponding to the image capture date and time (if known) and geographic location (if known), as previously described in reference to FIGS. 5-7, and further combines these ranges with the possibilities to determine a feasible solution for the image's orientation. For example, if the location of capture is in the northern hemisphere and the sun is not directly overhead, the sun must be at least partially in a southerly direction. Therefore, the system may eliminate all possibilities that would result in the sun being in a northerly direction, i.e., the system may determine that "Possibility #2" is the most likely possibility (because the sun would be within the range of 90° and 180°) and estimate that due north corresponds with reference line 1120. Although the foregoing example has been described using a road as the geographic feature that is used to produce the possibilities, other geographic features may also be used, such as sidewalks, paths, structures, bodies of water, forests, or fields to produce the set of possibilities.

The orientation of imagery may be further determined based on combinations of estimates. For instance, if the orientation of a particular photo sphere may be estimated as described above in connection with two or more of FIGS. 4, 8, 9 and 10, the estimated orientation may be based on an average, product, or consensus of all of the estimates. Moreover, estimates may be eliminated or their contribution enhanced or decreased based on the confidence associated with each estimate.

In addition to or instead of the sun, other celestial bodies may be used. For example, the azimuth and elevation of the moon may be calculated based on the location and time of the image capture, and its position identified in imagery. Stars, planets, comets, and constellations may be similarly used.

Figure 11:
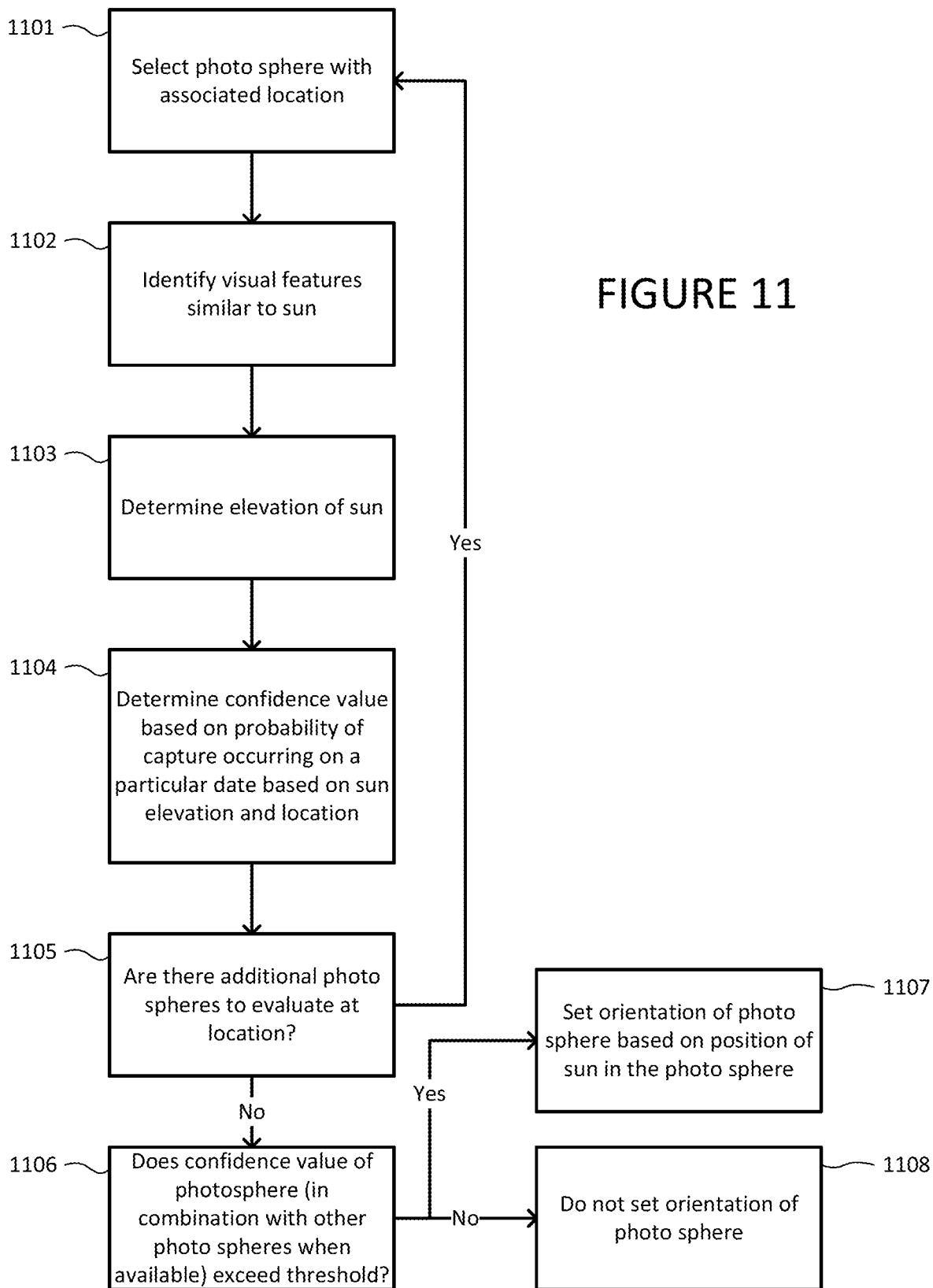
FIG. 11 is an example flow diagram in accordance with aspects of the disclosure.

FIG. 11 is a flowchart in accordance with some of the aspects described above. At block 1101, a photo sphere that is associated with a geographic location is selected. The photo sphere is analyzed to identify visual features similar to the appearance of the sun (block 1102) and the elevation of the sun is determined based on the position of the feature within the image (block 1103). At block 1104, the probability of the capture occurring on a particular date is determined based on the elevation of the sun and the geographic location. If there are additional photo spheres to be evaluated (block 1105), they are selected and similarly analyzed. If additional photo spheres were evaluated, a confidence value of the first photo sphere may be adjusted based on the confidence values determined for the other photo spheres. In block 1106, if the confidence value exceeds a threshold, the orientation of the photo sphere may be set based on the position of the sun within the photo spheres (block 1107). Otherwise, the orientation is not set as shown in block 1108.

Figure 12:
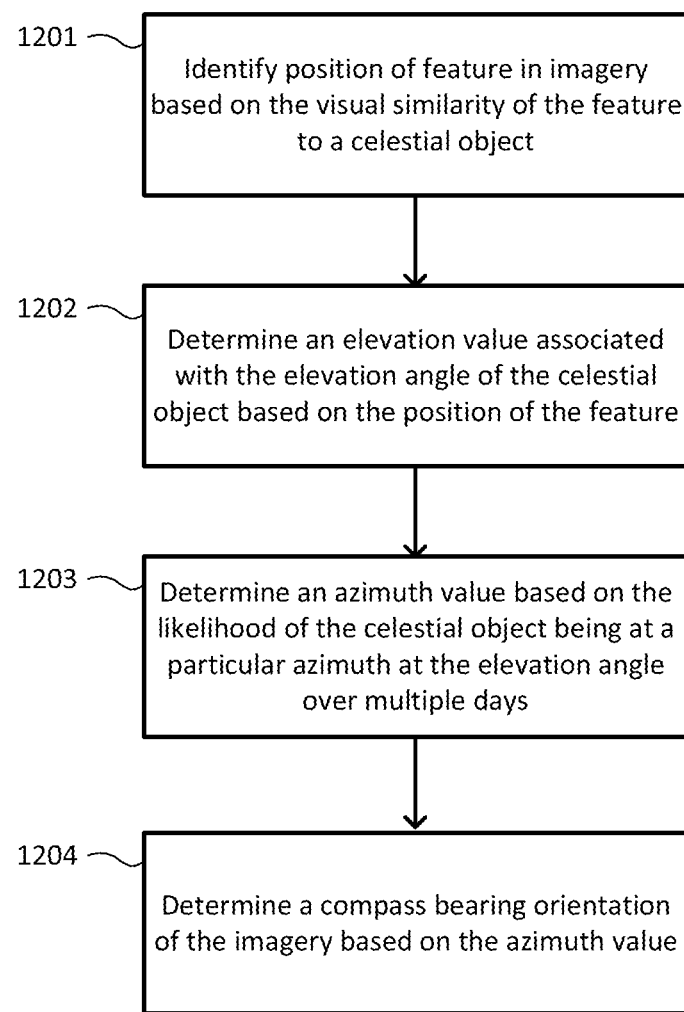
FIG. 12 is an example flow diagram in accordance with aspects of the disclosure.

FIG. 12 is another flowchart in accordance with some of the aspects described above. At block 1201, the position of a feature in imagery is identified based on the visual similarity of the feature to a celestial object. At block 1202, an elevation value associated with the elevation angle of the celestial object is determined based on the position of the feature. At block 1203, an azimuth value based on the likelihood of the celestial object being at a particular azimuth at the elevation angle is determined over multiple days. At block 1204, a compass bearing orientation of the imagery based on the azimuth value is determined.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A system comprising:
one or more processors; and
memory storing instructions executable by the one or more processors to perform a method comprising:
identifying a first position of a first feature in imagery based on a visual similarity of the first feature to a celestial object;
identifying a second position of a second feature in the imagery based on a visual similarity of the second feature to an object associated with a known geographic location;
determining, based on the first position relative to the second position, an azimuth angle, including determining an azimuth associated with a position 180 degrees from the second position of the second feature;

associating a portion of the imagery with the determined azimuth angle; and determining, based at least partially on the azimuth angle and the azimuth, an orientation of the imagery.

2. The system of claim 1 wherein identifying a second position of a second feature comprises determining the visual similarity of the second feature to a road.

3. The system of claim 2 wherein determining an azimuth angle comprises determining a set of possible azimuth locations of the celestial object.

4. The system of claim 1 wherein determining an azimuth angle comprises determining potential azimuth angles associated with the second position and comparing the potential azimuth angles to the first position.

5. The system of claim 1 wherein the imagery is a photo sphere and the celestial object is the sun.

6. The system of claim 1 wherein identifying a second position of a second feature comprises determining the visual similarity of the second feature to a sidewalk.

7. The system of claim 1 wherein identifying a second position of a second feature comprises determining the visual similarity of the second feature to bodies of water.

8. The system of claim 1 wherein identifying a second position of a second feature comprises determining the visual similarity of the second feature to a forest.

9. The system of claim 1 wherein the imagery is a photo sphere and the celestial object is the moon.

10. The system of claim 1 wherein the imagery is a photo sphere and the celestial object is a star.

11. A method, comprising:
identifying, with one or more processors, a first position of a first feature in imagery based on a visual similarity of the first feature to a celestial object;

identifying, with one or more processors, a second position of a second feature in the imagery based on a visual similarity of the second feature to an object associated with a known geographic location;

determining, with one or more processors based on the first position relative to the second position, an azimuth angle, including determining an azimuth associated with a position 180 degrees from the second position of the second feature;

associating, with one or more processors, a portion of the imagery with the determined azimuth angle; and determining, based at least partially on the azimuth angle and the azimuth an orientation of the imagery.

12. The method of claim 11 wherein identifying a second position of a second feature comprises determining the visual similarity of the second feature to a road.

13. The method of claim 12 wherein determining an azimuth angle comprises determining a set of possible azimuth locations of the celestial object.

14. The method of claim 11 wherein determining an azimuth angle comprises determining potential azimuth angles associated with the second position and comparing the potential azimuth angles to the first position.

15. The method of claim 11 wherein the imagery is a photo sphere and the celestial object is the sun.

16. The method of claim 11 wherein identifying a second position of a second feature comprises determining the visual similarity of the second feature to a sidewalk.

17. The method of claim 11 wherein identifying a second position of a second feature comprises determining the visual similarity of the second feature to bodies of water.

18. The method of claim 11 wherein identifying a second position of a second feature comprises determining the visual similarity of the second feature to a forest.

19. The method of claim 11 wherein the imagery is a photo sphere and the celestial object is the moon.

20. A non-transitory computer-readable medium storing instructions executable by one or more processors to perform a method, comprising:
identifying a first position of a first feature in imagery based on a visual similarity of the first feature to a celestial object;

identifying a second position of a second feature in the imagery based on a visual similarity of the second feature to an object associated with a known geographic location;

determining, based on the first position relative to the second position, an azimuth angle, including determining an azimuth associated with a position 180 degrees from the second position of the second feature;

associating a portion of the imagery with the determined azimuth angle; and determining, based at least partially on the azimuth angle and the azimuth an orientation of the imagery.

* * * * *